United States Patent
Lerner

(10) Patent No.: US 6,639,190 B2
(45) Date of Patent: Oct. 28, 2003

(54) HEAT ALERT SAFETY DEVICE FOR SMOOTHTOP STOVES AND OTHER HOT SURFACES

(76) Inventor: William S. Lerner, 215 E. 68th St., Apt. 23A, New York, NY (US) 10021-5729

( * ) Notice: Subject to any disclaimer, the term of this patent is extended or adjusted under 35 U.S.C. 154(b) by 0 days.

(21) Appl. No.: 09/788,594

(22) Filed: Feb. 21, 2001

(65) Prior Publication Data

US 2002/0113057 A1 Aug. 22, 2002

(51) Int. Cl.$^7$ .................................................. H05B 3/68
(52) U.S. Cl. .................................................. 219/445.1
(58) Field of Search ........................... 219/445.1, 446.1, 219/448.11, 460.1, 465.1; 428/1.1, 320.2; 349/11, 12, 20, 21; 374/161, 162

(56) References Cited

U.S. PATENT DOCUMENTS

| | | | |
|---|---|---|---|
| 3,590,371 A | * | 6/1971 | Shaw, Jr. .................... 116/216 |
| 3,796,884 A | * | 3/1974 | Tricoire .................... 250/316.1 |
| 3,893,340 A | * | 7/1975 | Parker ........................ 116/207 |
| 4,032,687 A | * | 6/1977 | Hornsby, Jr. ................ 220/694 |
| 4,390,275 A | * | 6/1983 | Schilf et al. ................ 349/199 |
| 4,891,250 A | * | 1/1990 | Weibe et al. ................ 174/255 |
| 5,499,597 A | * | 3/1996 | Kronberg .................... 116/216 |
| 5,997,964 A | * | 12/1999 | Klima, Jr. .................... 349/122 |

* cited by examiner

*Primary Examiner*—Sang Paik
(74) *Attorney, Agent, or Firm*—Steven Horowitz

(57) ABSTRACT

Liquid crystals compositions designed to turn red or orange and remain red or orange at or above a specified temperature, such as 115 degrees Fahrenheit, are shaped in the outline of the word "HOT" and are embedded on the top surface of the heating element of stoves or on the window surface of wall ovens and toaster ovens so that they glow red or orange and instantly alert anyone that the heat element of the stove or the window is too hot to touch. For use on smooth cooktop stoves, including warming trays, the liquid crystal display is embedded in a top surface of the smooth area of glass or metal that forms the beating element of the stove. For wall ovens and toaster ovens, the liquid crystals are embedded in the vertical window surface. A versatile heat alert safety device is removably attachable to any hot surface whether flat or rounded.

2 Claims, 7 Drawing Sheets

FIG.5
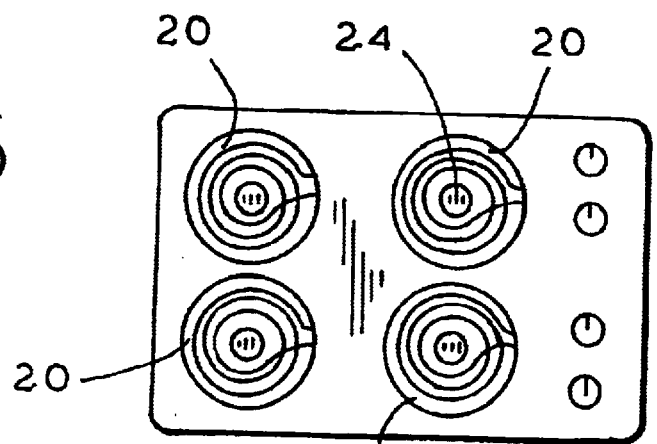
FIG.6
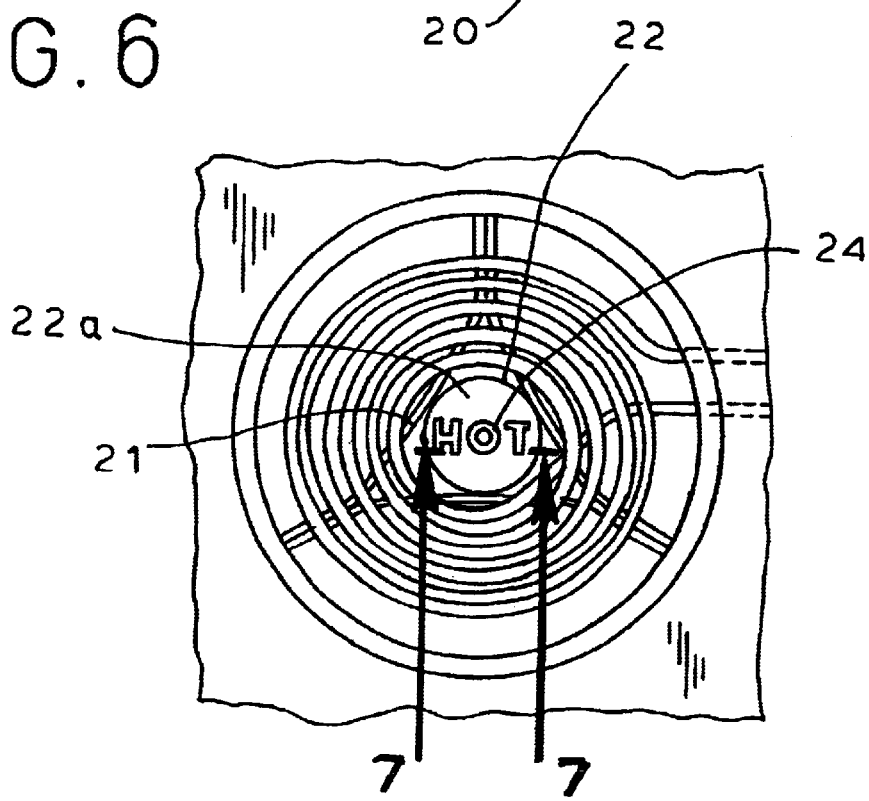
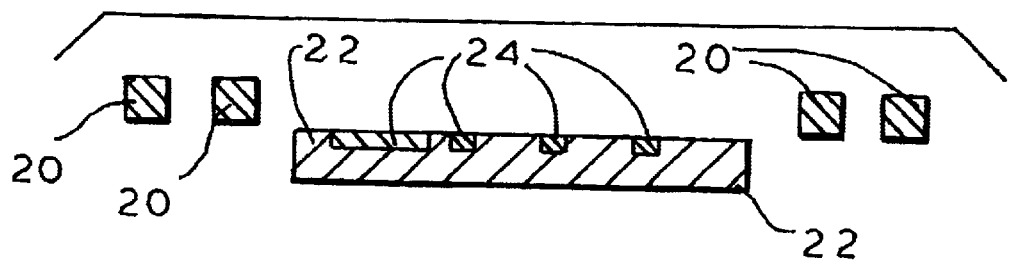
FIG.7

FIG. 11
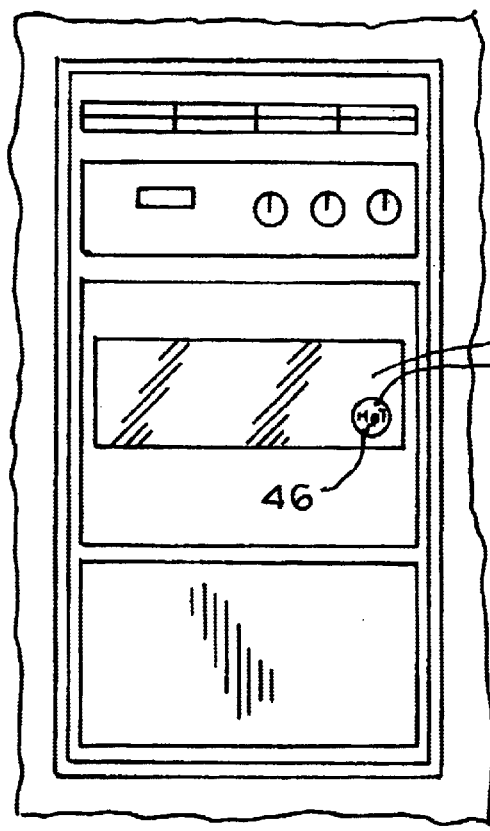
FIG. 12
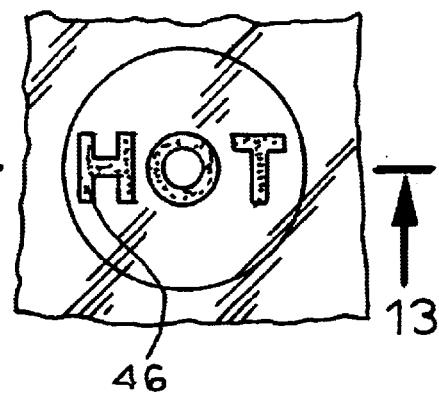
FIG. 13
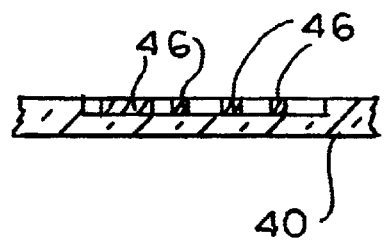
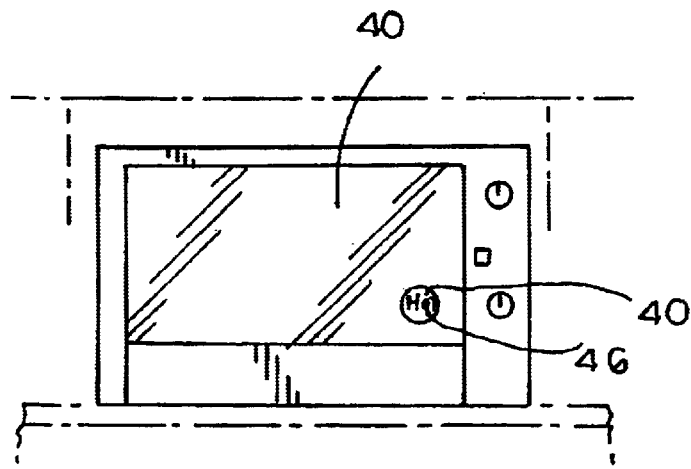
FIG. 14

FIG.15A
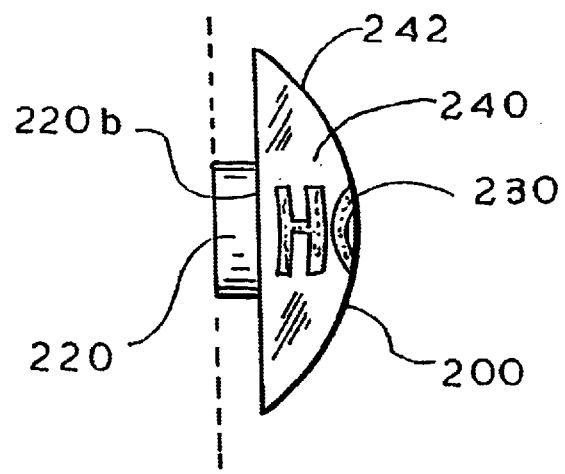
FIG.15B
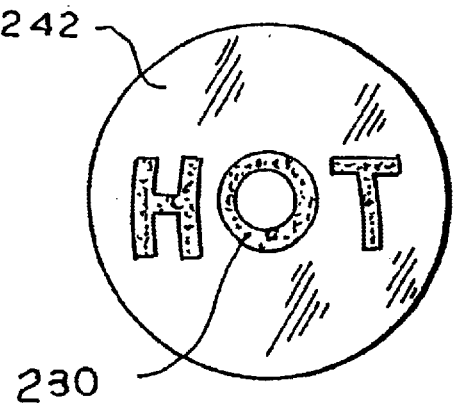
FIG.16A
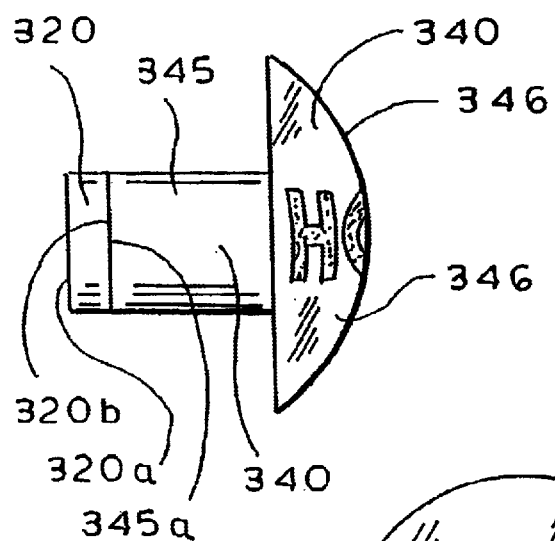
FIG.16B
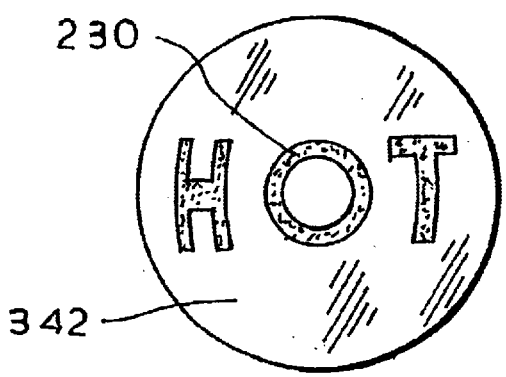
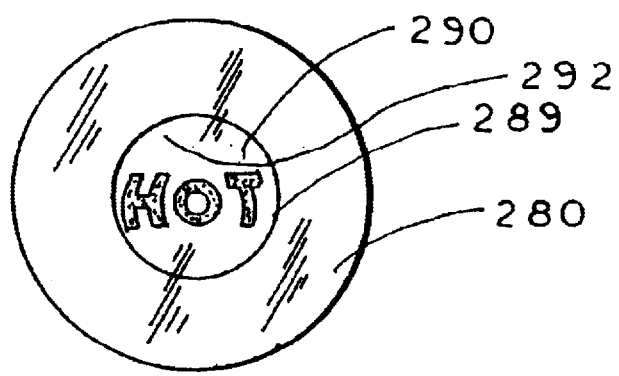
FIG 17

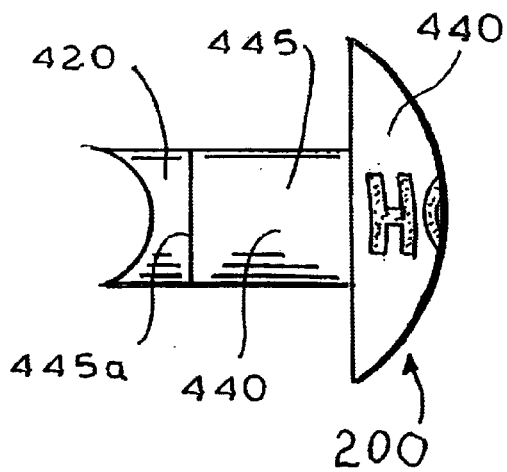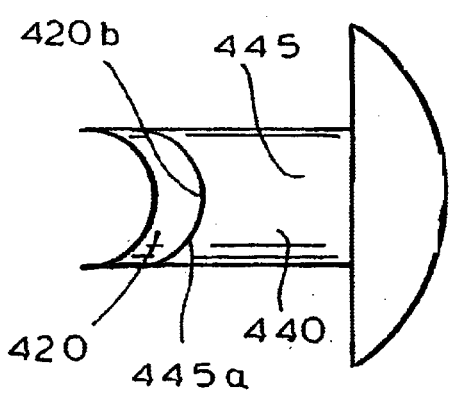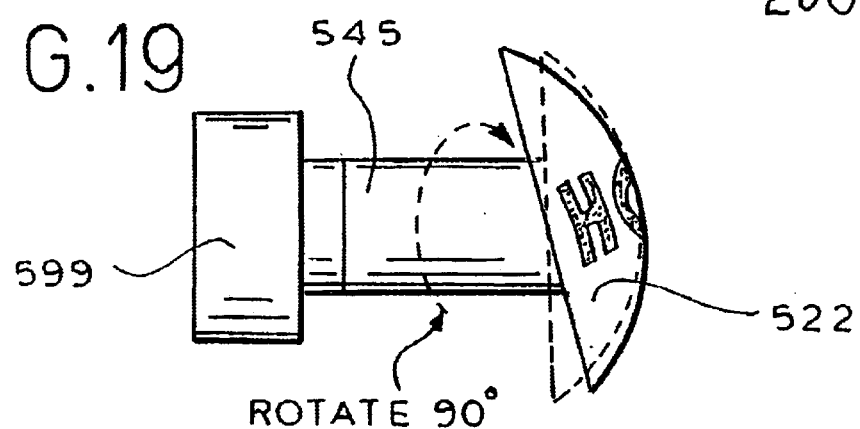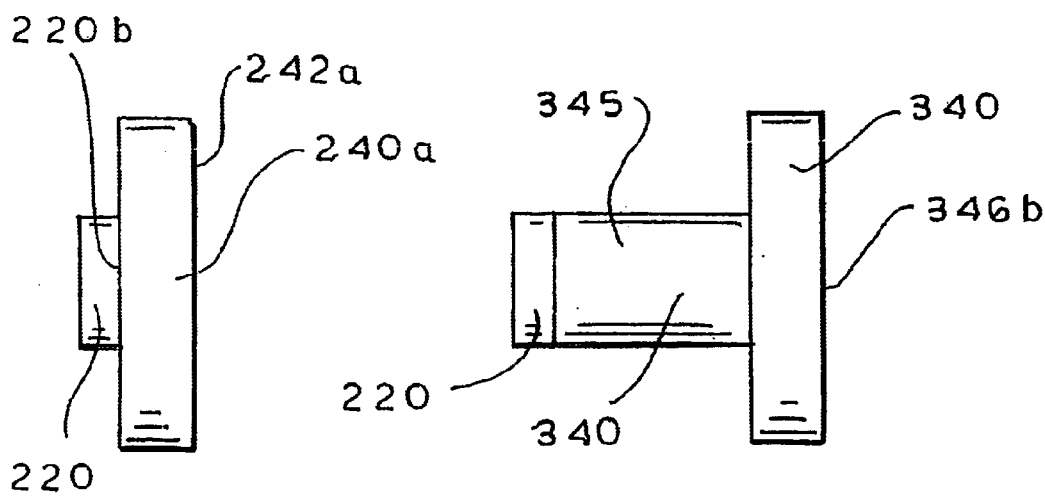

HEAT ALERT SAFETY DEVICE FOR SMOOTHTOP STOVES AND OTHER HOT SURFACES

FIELD OF THE INVENTION

The present invention relates to safety devices used in cooking or other activities involving hot surfaces and in particular it relates to safety devices that alert someone that the surface of a stove or other appliance or device is too hot to touch. It also relates to detachable heat alert safety devices for any hot surface.

BACKGROUND OF THE INVENTION

With respect to stoves and related appliances, various kinds of stoves—electric, gas, smooth cooktop using glass or metal tops—and toaster ovens are well known to be used for heating food. In addition, "mobile stove-type appliances" such as hot plates and warming trays are well known to be used for heating food. Each of these kinds of stoves and "mobile stove-type appliances" present a safety problem since the heating elements of the stove are hot during the cooking process and remain hot well afterwards. During the cooking process, the safety problem caused by touching the heating element is mitigated somewhat by visual inspection of the stove. With a gas, electric or smooth top stove, for example, the presence of a pot or other utensil on top of the stove might alert someone to the fact that the stove appears to be in use for cooking and therefore too hot to touch. Even the presence of a pot or other utensil is not a reliable clue, however, since people tend to leave tea kettles on their stove perpetually. When the cooking process has ended, however, it is generally impossible to detect that the heating elements of the stove remains hot and would burn the skin of anyone who touched them. There is no visual or other clue that the stove is hot.

To some degree, adults have developed an inherent caution when approaching stoves because of their experience and knowledge in dealing with such safety problems. This inherent caution, however, does not obviate the need for a device that warns the adult when touching the stove would be dangerous. Moreover, children, and particularly young children, usually have not developed such a watchfulness and there has long been a need for a device that can prevent burn accidents to children who may inadvertently touch a stove that is hot, especially when the stove remains hot well after the cooking process has ended.

Furthermore, the reduction in the size of modem kitchens has led the occupants of modern apartments to make use of the stove as an extension of the counter top adjacent the stove as a resting places for large items that have been carried into the kitchen area. An example of such items is heavy bags of groceries brought into the kitchen. There is an urge to set the bags down on the nearest flat surfaces, which may be the top of a stove adjacent a counter top. This is particularly true for those stoves that are smooth on top, such as smooth cooktops. In general, the top surfaces of modem kitchen stoves are increasingly flat, especially the top surfaces of smooth cooktops. These factors have only increased the danger to adults when the top surfaces of stoves are used as a resting place for packages, such as groceries brought into the kitchen.

Smooth cooktop stoves presently are also dangerous if touched on their top surface when they are still hot, even after use. These smooth cooktop stoves, or "smoothtops" as they are sometimes called, utilize as the heating element separate areas on the top surface of the stove (at the same location that gas stove would have burners) which are made of glass. Under each area, usually circular, is a strong light source, such as a halogen lights. The light source projects the light upward to the surface area of the smoothtop's heating element—the glass area on the top surface of the stove. Since the glass area is coated on its bottom with a dark coating, when the light strikes it, the heat from the strong light is absorbed by the glass area and these glass surfaces form each heating element of the stove.

Another variation of the smooth cooktop is the use of a "ribbon heating element" where the smooth glass surface is heated by a coiled electric circuit called a "ribbon element" just underneath it instead of by a halogen light source. The heat is transmitted directly upward so that only the heat element itself gets hot and the rest of the cooktop surface remains cool. In some cases, the ribbon heating element also has another feature whereby the heating element is made of two concentric circles so that the option exists of two sizes of the heating element to match the two different sizes of the pans that need to be heated. This new technology does not solve the problem of warning adults and children that the heating element should not be touched when the cooking process has ended. If anything, it generates the additional hazard that someone can be lulled into touching the heating element after thinking the heating element is cool since the surface right adjacent to it is indeed cool.

With respect to toaster ovens, because of its mobility the danger of touching the window of a toaster oven exceeds that of the typical immobile oven. The toaster oven can be placed on a counter top or other portion of the kitchen not directly in the "cooking center". Consequently, an adult and especially a child, or the elderly, is not likely to remember not to touch a window of a toaster oven when it is off (soon after it had been on). In addition, the door of a toaster oven can be left open and jut out further toward someone in the kitchen.

Presently, in order to address the danger of touching a hot "smoothtop" stove, such stoves generally have several light indicators, each one corresponding to each heating element, all located in small one rectangular area on the surface of the cooktop. The light indicators remain lit for a certain length of time after the stove's heating element is turned off in order to deter someone from touching the heating element when it is still hot, although "off". Unfortunately, this attempt to address the danger of touching a hot stove of the smooth cooktop variety is insufficient as a warning system (putting aside the fact that the light indicators are designed only for the smooth cooktop variety stoves to begin with and not for gas and electric coil stoves).

A quick glance at the group of light indicators would not be sufficient to warn the average adult, no less children or the elderly, that a particular heating element is too hot. This is because the group of light indicators do not immediately tell someone which heating elements correspond to which light indicators. At a minimum, several seconds of concentration are needed in order to determine from the light indicators that are "on", which heating elements are too hot to touch. Most adults, and certainly most children, cannot afford those seconds of deduction since their desire to touch the stove is immediate. In addition, an adult carrying groceries into the kitchen and looking for a counter top to place them on or a child running into and playing in the kitchen are even less likely than the average adult or child to take the time to engage in a several second thinking process. Accordingly, the child or the adult will be inadequately warned about the danger of being burned. With this in mind, it is no surprise that a 1997 industrial design exhibit at the Cooper Hewitt (Smithsonian) in New York demonstrated that over 69% of adults can not match the control knob with its corresponding burner (i.e. heating element) on a stove.

There is also not presently known any effective warning method for the vertical surfaces of oven windows, including the windows of wall ovens, regular ovens and toaster ovens. This is particularly important since when the oven is turned off, the oven window remains very hot even though it appears that everything is off.

In addition, while devices that make use of liquid crystal compositions are known to indicate the surface temperature of an appliance, these devices are not designed to warn someone of the danger of touching hot stoves. For example, U.S. Pat. No. 3,827,301 to Parker discloses an apparatus for indicating the temperature of a surface of an appliance. It has a first portion in contact with the appliance surface or connected by copper wires or heat pipes to the appliance surface. It has a second portion, a poor heat conducting member in heat exchanging relationship to the ambient environment, that has bands of liquid crystal material extending away from the first portion thereby creating a temperature gradient extending away from the surface of the appliance.

Devices such as disclosed in Parker that provide temperature determinations are not adequate for instantly warning a child or even an adult that the heating element of a stove is too hot to touch for one thing because quantitative temperature determinations are inadequate to provide the immediate warning that is necessary. Moreover, the device of Parker and other liquid crystal compositions are not specifically suited to be manufactured as part of a stove. In addition, these devices are not suitable as attachments to stoves and certainly not as attachments to a smooth cooktop stove.

The present invention is also applicable, not just to stoves and related appliances, but to any other surface that one may need to be warned that it is hot. There are numerous devices whose surfaces become hot and remain hot even after the device has been shut off either electrically or otherwise. For example, a radiator cap becomes hot when the vehicle and radiator shut off. Also, any kind of piping that is a conduit for hot liquids is an example of a surface that one may need to be warned that it is hot. Other devices having hot surfaces include hot surfaces on fireplace doors, radiator caps, irons, chafing dishes, coffee urns, heating pipes, home radiators, glue guns, oven doors, portable heaters of electric, oil and ceramic disc, kerosene lamps, kerosene heaters, barbecue grills of electric, gas or coal, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, cappucino and espresso makers, autoclaves used to sterilize instruments in a medical setting, movie projectors and other such hot surfaces. These and other hot surfaces are exposed to children, maintenance works and ordinary adult users.

Accordingly, there is needed a versatile, easily movable and mountable, removably attachable and detachable, and effective, convenient and easy to manufacture device for warning adults, workers and children instantly when any kind of surface, whether it be a stove of any kind or any other surface, is too hot to touch. There is also a need for such a device that is both capable of installation on a previously purchased stove of any known type, including cooktops, electric and gas stoves, and one that is also capable of being manufactured as part of the stove by stove manufacturers. The present invention addresses and satisfies all of these needs and provides other advantages.

There is also a need for an effective, convenient and east to use and detachable heat alert safety device that is easily read and understood for warning adults and children when any surface is too hot to touch. Such a device should ideally be positionable at a variety of heights or positions so that it can be custom tailored for children of different height.

Importantly, moreover, there is a need for a heat alert safety device that is versatile enough to be easily positioned on a hot surface and yet be able to be easily removed thereafter when it has served its purpose—either with respect to that surface or it has served its purpose with respect to that particular individual or it has served its purpose for that individual for that particular moment—and then be repositioned elsewhere—either on another hot surface of another object or another surface of the same object or even another portion of the same surface of the same appliance. This is necessary because in order for the heat alert safety device of the present invention to be effective it has to be visible (or at least discernable) and in addition it should be discernable and effective for children; and since children of different ages are of different heights it is advantageous to be able to attach the device to. It is also necessary because a particular individual may decide to relocate the heat alert safety device when a different appliance is used or when a different portion of a kitchen counter is used, or when any other object with a hot surface is activated. It should be noted that by "activated" is included situations when an object is "hot" a certain amount of time after the source of the heat was "on" and it is of course not intended that the device of the present invention is limited to situations when electricity is "on" for an appliance or other object.

SUMMARY OF THE INVENTION

In the present invention, liquid crystal compositions that change color and remain at that color when they reach or exceed a certain temperature (referred to generally herein as "liquid crystal compositions"), such as cholesteric liquid crystals or various types of liquid crystal polymers designed to turn color when they reach a certain temperature, and that are shaped in the outline of the word "HOT" are embedded in a device attachable to or forming a part of any hot surface such as the top surface of the heating element of stoves so that they glow red and instantly alert anyone, including a child, that the heating element of the stove is too hot to touch even when the stove or other device is "off". In one embodiment described and claimed in my previous patent, U.S. Pat. No. 6,104,007, for use on electric stoves, the device is an improved electric coil whose central area contains the liquid crystals. In a second embodiment for use on smooth cooktop stoves, wall ovens and toaster ovens, the liquid crystal display is embedded in the glass areas that form the heating elements of the smooth cooktop stove. As an alternative to the second embodiment, for smooth cooktop stoves, the liquid crystal display is in the shape of a ring surrounding the heating element (and visible when pots are placed on the heating element) which ring may have an interrupted area in the outline of the letters "HOT"). In a third embodiment for gas stoves also described and claimed in U.S. Pat. No. 6,104,007, the liquid crystals are embedded in a recessed disk mounted on top of the central element of the gas stove's burner. In each embodiment, the liquid crystals stay red as long as the temperature they sense exceeds a certain degree Fahrenheit, such as 115 degrees Fahrenheit, which has been found to be too hot to touch. In a fourth embodiment for use on wall ovens and toaster ovens, the liquid crystal display is embedded in the glass areas that form the heating elements of the smooth cooktop stove.

In one embodiment described in detail herein, in order too achieve removable attachability and placement, the heat alert safety device is made of two part, a half-dollar disk made of Pyrex and containing the liquid crystal composition and an attachment and heat conducting element in a disk in the shape of a dime on the back of the half-dollar shaped disk.

OBJECTS AND ADVANTAGES

The following important objects and advantages of the present invention are:

(a) to provide a device that instantly warns anyone including a child that the surface of a stove, hot plate, the window of a toaster oven, or other hot surface is too hot to touch, (b) to provide a device that instantly displays to anyone the letters "HOT" as a warning on the surface of a stove, (c) to provide a device that instantly provides a warning display to anyone using the letters "HOT" that appears directly on the heating element of the stove surface so that it is clear to anyone what is too hot to touch, (d) to provide a versatile heat warning device that can be used for smooth cooktop stoves having any kind of surface including glass or metal and using any kind of technology including electric heating, electric induction and halogen light heating, or can be used for electric stoves, or for gas stoves, for wall ovens, for toaster ovens, for hot plates or for warming trays, (e) to provide a device for smooth cooktop stoves having any kind of surface including glass or metal and using any kind of heating technology including electric heating, electric induction and halogen light heating that instantly displays to anyone as a warning on the surface of the stove a ring surrounding each heating element of the stove, which ring may contain in an interrupted area of the ring the letters "HOT", the ring and letters turning red at a certain temperature of the heating element, (f) to provide a heat warning device that is easy to manufacture and that can be either installed onto the stove (or other appliance's) heating element or can be manufactured as part of the stove, (g) to provide a heat warning device for stoves that can be calibrated to signal the word "HOT" or in the case of cooktop stoves to light up a ring around the heating element only when a certain temperature, such as 115 degrees Fahrenheit, is reached and that can remain in signaling mode as long as such temperature is exceeded by the appliance surface, (h) to provide a heat warning device as above that makes use of liquid crystals that change color when a certain temperature is reached, such as cholesteric liquid crystals or various types of liquid crystal polymers designed to change color when a certain temperature is reached, (i) to provide a heat warning device that is removably attachable to a wide variety of hot surfaces in a very simple manner, (j) to provide a heat warning device that can is readable by children and whose placement can be adjusted when the child grows taller, (k) to provide such a heat warning device that can be angled for easier reading on surfaces in out-of-the-way locations such as pipes, (l) to provide such a heat warning device that contains a magnet or an electrically conductive plastic that makes the device removably attachable to any hot metal, glass or other suitable surface and capable of receiving heat transmitted from the hot surface and transferring it to the liquid crystals that change color when a certain temperature is reached and (m) to provide a heat alert safety device that is readily attachable to and detachable from hot surfaces on fireplace doors, radiator caps, irons, chafing dishes, coffee urns, heating pipes, home radiators, glue guns, oven doors, portable heaters of electric, oil and ceramic disc, kerosene lamps, kerosene heaters, barbecue grills of electric, gas or coal, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, cappucino and espresso makers, autoclaves used to sterilize instruments in a medical setting, movie projectors and other such hot surfaces.

BRIEF DESCRIPTION OF THE DRAWINGS

FIG. 5 is a top plan view of the device of the present invention used on an electric stove.

FIG. 6 is an enlarged fragmentary plan view of one heating element of an electric stove having the device of the present invention.

FIG. 7 is an enlarged fragmentary cross-sectional view taken along line 7—7 of FIG. 6.

FIG. 11 is a front elevational view of a wall stove having the device of the present invention.

FIG. 12 is an enlarged fragmentary front elevational view of one heating element of a smooth cook top stove having the device of the present invention.

FIG. 13 is a enlarged fragmentary cross-sectional view taken along line 13—13 of FIG. 12.

FIG. 14 is a front elevational view of a wall oven having the device of the present invention.

FIG. 15A is a side view of an alternative embodiment of the device of the present invention.

FIG. 15B is a front view of an alternative embodiment of the device of the present invention.

FIG. 16A is a side view of an alternative embodiment of the device of the present invention.

FIG. 16B is a front view of an alternative embodiment of the device of the present invention.

FIG. 17A is a side view of an alternative embodiment of the device of the present invention.

FIG. 17B is a front view of an alternative embodiment of the device of the present invention.

FIG. 18A is a side view of an alternative embodiment of the device of the present invention for attaching to rounded hot surfaces.

FIG. 18B is a side view of an additional alternative embodiment of the device of the present invention for attaching to rounded hot surfaces.

FIG. 19 is an alternative embodiment of the device of FIG. 16A that can be positioned at different angles.

FIG. 20A is an alternative embodiment of the device of FIG. 15A including a straight face.

FIG. 20B is an alternative embodiment of the device of FIG. 16A including a straight face.

DETAILED DESCRIPTION OF THE DRAWINGS

Figure 1:
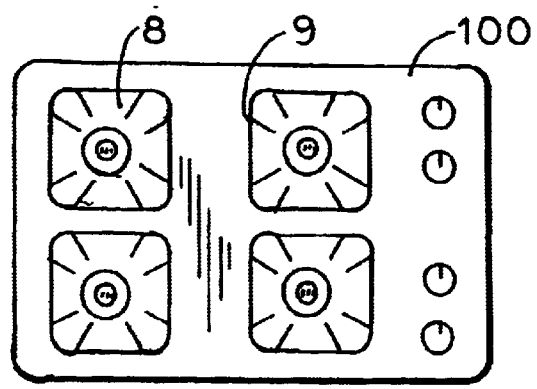
FIG. 1 is a top plan view of a gas stove having the device of the present invention on each burner.
Figure 2:
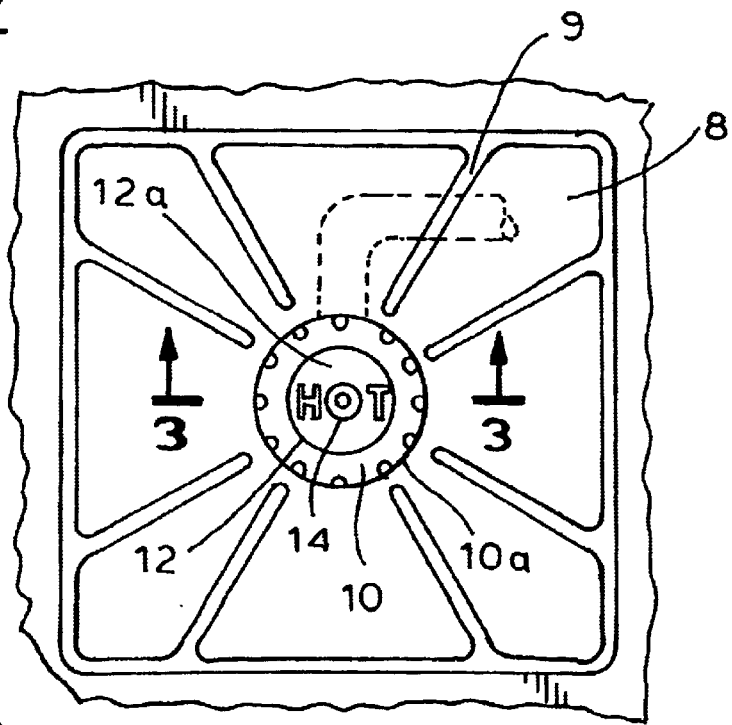
FIG. 2 is an enlarged fragmentary plan view of a heating element of a gas stove having the device of the present invention.
Figure 3:
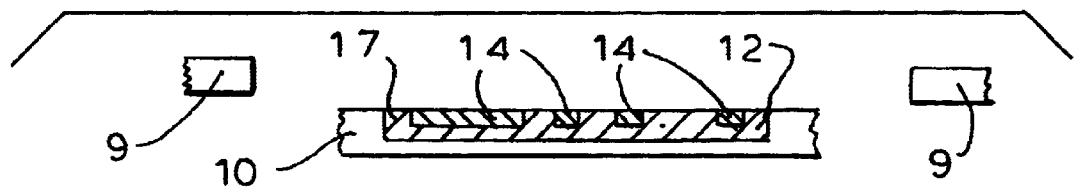
FIG. 3 is an enlarged fragmentary cross-sectional view taken along line 3—3 of FIG. 2.

One of the embodiments of the present invention, as described and claimed in my previous patent, U.S. Pat. No. 6,104,007, is for stoves that employ gas heat, as seen in FIGS. 1–3. In this embodiment, the top of the stove 100 typically has four heating elements 7, that are called burners and that are covered by metal grates 9, that are open in the middle. Each burner or heating element is situated in a recessed area 8 and is surrounded by the metal grate. As best seen in FIG. 2, there is a central metal element 10 in which a series of gas inlet holes on the side 10a of the central metal element permit gas to flow through and ignite. As seen in FIGS. 1–3, the central metal element 10 has a disk 12 on a top surface 12a of the central metal element 10 and this disk 12 contains liquid crystals 14 in the form of the letters "HOT" that change color when they reach a certain temperature. Alternatively, the central metal element 10 itself can have embedded therein on its top surface the liquid crystals 14 in the shape of the letters "HOT" using known methods.

The temperature of the grates upon which pots and pans rest during cooking may be roughly equal to the temperature of the central metal element 10. Accordingly, whenever the letters "HOT" become red both the grates and the central metal element may be too hot to touch. However, there may be some discrepancy between the temperature of the grates and that of the central metal element 10. To take into account any discrepancy between the temperature at which the central element 10 becomes cool and the temperature at which the metal grates become cool enough for safe touch, the turning temperature, as an option, the temperature at which the liquid crystal compositions 14 (such as cholesteric liquid crystals or various types of liquid crystal polymers designed to turn red at a specific temperature) turn red, can be calibrated by lowering the turning temperature by an estimate of the amount of this discrepancy so that if either the grates or the central metal element 10 is too hot the liquid crystals 14 will remain red.

FIGS. 5–7 depict an embodiment of the present invention described and claimed in my previous patent, U.S. Pat. No. 6,104,007, for the top surface of electric stoves. Electric stoves typically have four heating elements on the top of the stove made of electric coils 20 wound in a serpentine configuration and sitting on a metal rest 21. Normally, electric coils 20 have a recessed disk 22 in a central area of each coil 20 that is connected to and held up by the metal rest 21. FIG. 5 shows top plan view and FIG. 6 shows an enlarged fragmentary plan view of electric coil 20 of the present invention having central disk 22 containing liquid crystal compositions 24 (which may be cholesteric liquid crystals or various types of liquid crystal polymers designed to turn color at a specific temperature) that are in the shape of the letters "HOT" embedded on the top surface 22a thereof. The liquid crystals 24 become red whenever the temperature of central disk 22 exceeds 115 degrees Fahrenheit and remains red unless and until this temperature is crossed again. This electric coil 20 may be made by embedding the liquid crystals 24 on the top surface 22a of the central disk 22 using methods well known in the art. Alternatively, existing electric coils can be modified by fitting thereon a disk containing on its top surface liquid crystals 24 embedded therein.

The central disk 22 containing liquid crystals 24 in the shape of the letters "HOT" embedded on the top surface 22a is recessed roughly a quarter of an inch below the surface of the electric coil 20 so that when pans and pots are placed on the electric coils they do not scratch the central disk 22.

As an option, since there may be some discrepancy between the temperature of the electric coil 20 and that of the central disk 22, the turning temperature at which the liquid crystals 24 turn red, can be set to be the lower of (i) the temperature of the electric coil 20 and (ii) the temperature of the central disk 22. This way, someone is warned against touching either the central element 22 or the actual coil 20.

Figure 4:
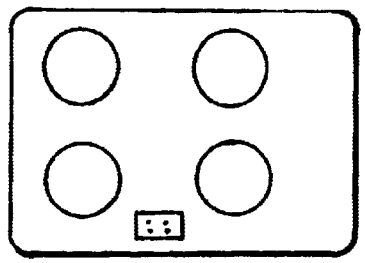
FIG. 4 is the prior art smooth cook top stove showing light indicators.
Figure 8:
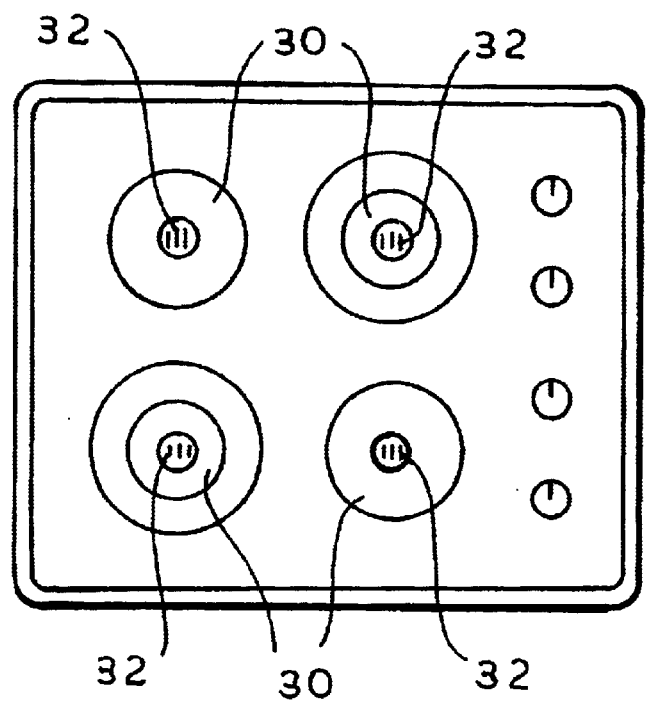
FIG. 8 is a top plan view of the device of the present invention on the smooth surface of a cook top stove.
Figure 9:
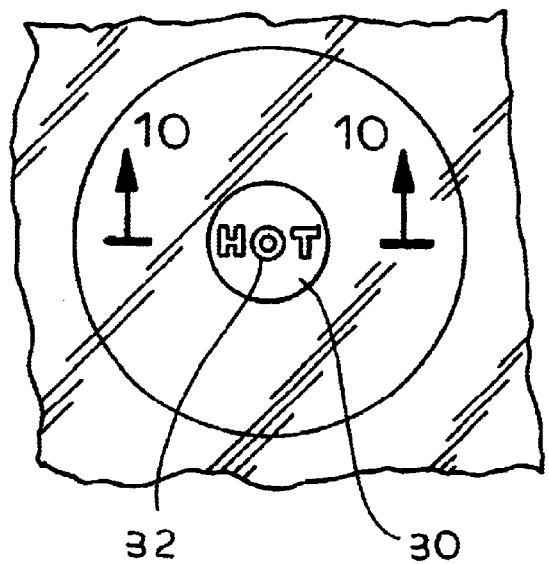
FIG. 9 is an enlarged fragmentary plan view of one heating element of a smooth cook top stove having the device of the present invention.
Figure 10:
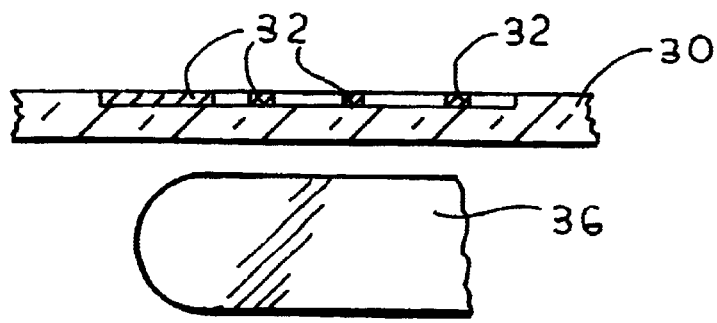
FIG. 10 is a enlarged fragmentary cross-sectional view taken along line 10—10 of FIG. 9.

FIGS. 8–10 depict an embodiment of the present invention for use with smooth cooktop stoves, sometimes called "smoothtops" or "cooktops". For cook top stoves, the prior art is shown in FIG. 4. As seen in FIGS. 8–10, smooth cooktop stoves have heating elements that consist essentially of an area of glass surface 30 that is smooth on top and whose underside is made dark enough to absorb light. Such absorption generates heat in the smooth area of glass 30. Underneath each area 30, usually circular, is a strong light source 36, such as a halogen lights. The light source 36, as seen in FIG. 10, projects the light upward to the surface area of the smoothtop's heating element—the glass area 30 on the top surface of the stove. Since each glass area is coated on its bottom with a dark coating, when the light strikes it, the heat from the strong light is absorbed by the darkened portion of the smooth area of glass 30. These glass surfaces 30 form the heating elements of the stove. For cooking, cooking utensils are simply placed over the area (which may be square, round, etc.) of the heating element on the glass surface. Some smooth cooktop stoves employ "radiant" heat sources for the glass areas instead of halogen light sources 36 but the effect is the same. In addition, some smooth cooktop stoves have halogen lamps (under each area 30 as before) but they emit infrared waves that provide light and heat.

The heat alert device of the present invention when used for the smooth surface of cooktop stoves of either type would comprise liquid crystal composition 32 embedded in the top surface of each glass area 30, which is the heating element on the smooth cooktop stove using known methods. For example, the liquid crystal composition 32 may be made in the exact shape of the letters "HOT" by spraying the composition of liquid crystals 32 over each glass area 30 after covering the glass area 30 with a cardboard stencil or other cut-out in the outline or shape of the letters "HOT". As before, the liquid crystal composition is designed to turn red and remain red whenever the temperature of the smooth area of glass exceeds a specified temperature, such as 115 degrees Fahrenheit.

Figure 9A:
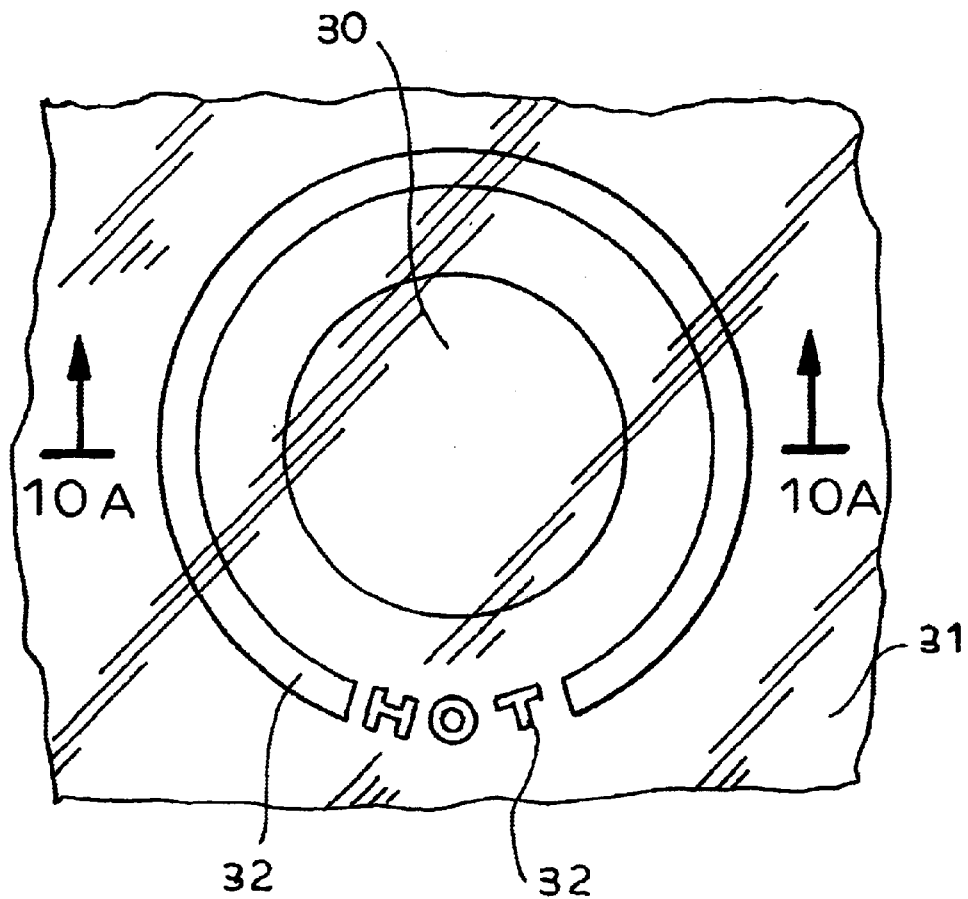
FIG. 9A is an enlarged fragmentary plan view of one heating element of a smooth cook top stove and having the device of the present invention in the shape of a ring surrounding the heating element.
Figure 10A:
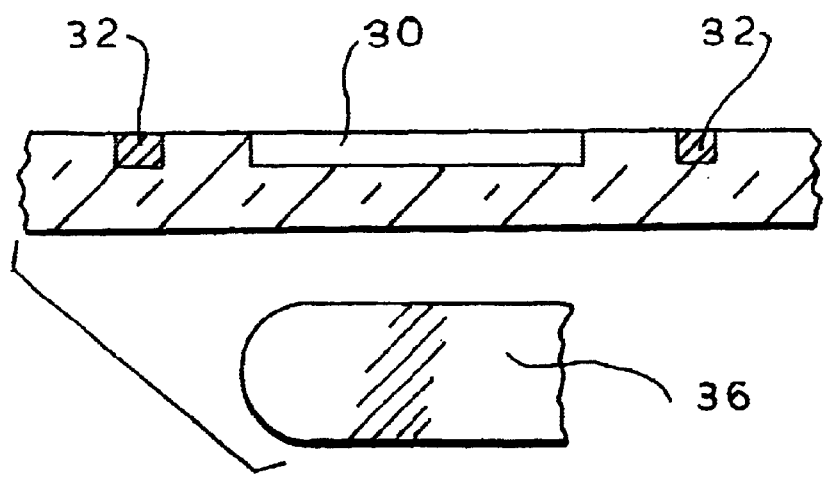
FIG. 10A is a enlarged fragmentary cross-sectional view taken along line 10A—10A of FIG. 9A.

As an alternative to the second embodiment, for smooth cooktop stoves using any technology including electric heating, electric induction and halogen light heating, the liquid crystal display is in the shape of a ring surrounding the heating element (and visible when pots are placed on the heating element) which ring may have an interrupted area in the outline of the letters "HOT", as seen in FIGS. 9A and 10A. This addresses and solves the problem that people often leave pots or kettles on the stove perpetually and that with cooktop stoves the result of doing so is that the heating element is no never visible (since the pot or kettle may be as large or large than the heating element). In such situations, no matter how mature, cautious and alert you are, you cannot readily ascertain that the heating element (and the kettle or pot above it) is too hot to touch. By seeing the ring of the present invention (with or without the letters "HOT" filling an interrupted portion thereof) lit up as red, you immediately know that the area of the heating element is too hot to touch. In this embodiment, the liquid crystal composition 32 is embedded on the stove surface in the outline of a ring (and in the letters "HOT") in a location of surrounding the heating element, i.e. surrounding the top surface of the smooth glass or metal areas 30 on the stove surface 31.

Although FIGS. 8–10 (including FIGS. 9A, 10A) have been described in terms of smoothtops with heating elements made of smooth glass surfaces, other variations of smooth top stoves exist—in particular smooth metal tops called electric cooktops. The difference is that a light source 36 would not be used under the surface to generate heat— instead the metal gets hot by being connected to a heat source that may be electric (not shown). In addition, some smooth cooktops use a "ribbon heating element" instead of halogen light sources where the smooth glass surface is heated by a coiled electric circuit called a "ribbon element" directly and immediately underneath the glass instead of by a halogen light source. The device of the present invention works the same way for metal cooktops, glass cooktops and for those that rely on halogen light source as the heat or those that use ribbon heating elements. FIGS. 8–9 which depicts the present invention for use with glass cooktops also depicts the present invention as applied to smooth metal cooktop stoves and as applied to ribbon heating elements. FIG. 10, which describes the present invention for use with glass cooktops that employ halogen light sources, the top part of FIG. 10 also depicts a cross section of the liquid crystal composition for smoothtops—for metal cooktops and glass cooktops using ribbon heating elements the halogen light source 36 would not be present but everything else would be the same. For all of the smooth cooktops, the liquid crystal composition 32 would still be embedded in the top surface of the smooth metal areas 30 on the stove surface in the shape of the letters "HOT".

Other variations of smooth cooktops also exist and the liquid crystal composition in the shape of the letters "HOT" can also be embedded in their surfaces. For example, some smooth cooktops have a raised solid element having a smooth top and made of metal having a recessed central area. The liquid crystal composition would be embedded in this recessed central area as before in the shape of the letters "HOT".

FIGS. 11–13 depict a wall oven whose window surface 40 has embedded thereon the liquid crystal composition 46 of the present invention in the shape of the letters "HOT". As before, the liquid crystal composition 46 is designed to turn red and remain red whenever the temperature of the smooth area of glass exceeds a specified temperature, such as 115 degrees Fahrenheit. The purpose is to warn children or adults not to touch the surface of the window 40 that gets very hot when the oven is on. There is not present a convenient and effective warning method in use for the vertical surfaces of oven windows. This is particularly important since when the oven is turned off, the window 40 remains hot even though it appears that everything is off.

Toaster ovens also have a window surface 40 which would have embedded thereon the liquid crystal composition 46 of the present invention in the shape of the letters "HOT". As before, the liquid crystal composition 46 is designed to turn red and remain red whenever the temperature of the smooth area of glass exceeds a specified temperature, such as 115 degrees Fahrenheit.

Hot plates can be thought of as small mobile electric stoves having one heating element. Warming trays can be thought of as small mobile smooth cooktop ovens having one smooth surface as a heating element. In both of these cases, the hot plate and the warming tray, the present invention would be applied to the heating element and function the same way as described with respect to their larger and more permanent counterparts—the electric stove and the cooktop stove.

It should be noted in general that the present invention makes use of any liquid crystal composition that changes color and remains at that color when a specified temperature is reached or exceeded—it need not necessarily be cholesteric, although it has been found that cholesteric liquid crystals do this effectively. It is also within the scope of the present invention to make use of a liquid crystal composition that changed color when it reached a specified temperature or temperature range but changed to a third color at a higher threshold temperature, so long as the third color is significantly different from the first color—although this would certainly not be the ideal kind of liquid crystal composition. The ideal composition turns red at a specified temperature and remains red above that temperature.

With use of the present invention, when an individual enters the kitchen with the cook top stove in it he or she can instantly recognize if any of the heating elements are too hot. This is in contrast to the prior art for which the person would have to first figure out which heating element corresponds to which light indicator.

The present invention contemplates that other letters and other letter shapes besides that of "HOT" could be used as a warning although it is believed that the simple arrangement of the letters "HOT" in the simplest typeset provide the best warning. Furthermore, the present invention also contemplates that the liquid crystal composition in the outline of the letters "HOT" can be embedded in a surface of a stove, toaster oven or other appliance where the surface is vertical and perpendicular to the floor, not only horizontal. In addition, while the drawings depict the liquid crystal composition embedded on the surface of the stove in a particular configuration and depth, it is contemplated by the present invention that the depth and configuration of the liquid crystal composition can vary and still be within the scope of this invention.

It is also contemplated by the present invention that glass disks containing liquid crystal compositions in the shape of the letters "HOT" can be made so as to be purchased separately by the consumer as a glass disk having embedded therein the liquid crystal composition to be affixed to a glass surface area of a cooktop stove, a wall oven or a toaster oven.

It is also contemplated by the present invention with respect to all embodiments that in addition to the liquid crystal composition conveying the outline of the letters "HOT" by being in an outline of the letters "HOT", the liquid crystal composition could instead convey the outline of the letters "HOT" by being in the background of such an outline. By this is meant that the liquid crystal composition would form the entire area except an outline of the letters "HOT". The point of one feature of the present invention is to use the liquid crystal composition to create a color contrast between red and some other color in order to depict the letters "HOT" in red whether by virtue of the liquid crystal composition itself being the letters "HOT" or whether the liquid crystal composition surrounds the letters and in effect constitutes everything else except the letters "HOT". Furthermore, it should be noted that in this patent application, the term "red" refers to all possible variations and shades of the color red as well as to all possible variations of the color orange. Red and orange are the colors associated with heat. Furthermore, if the hot surface (as opposed to the area of the liquid crystal composition) itself is or becomes red when hot, then the liquid crystal composition 230 would have to be orange and vice versa.

FIGS. 15 through 20 depict several alternative shapes for a versatile heat alert safety device 200 of the present invention. The versatile heat alert safety device of the present invention is designed to address many of the needs outlined, including the need for a device that can be attached to a hot surface and later removed and re-attached either to a different hot surface or a different part of the same hot surface. The hot surfaces are typically metal or glass but can be of other suitable materials. In each of the shapes shown in FIGS. 15–20, the device is essentially comprised of two parts, an attachment part and a container part having the liquid crystal composition, each of which is adjacent to the other. In some cases, the parts are attached like a dime affixed adhesively to the back of a half-dollar (of U.S. currency). It should be noted that for the embodiments depicted in FIGS. 15–20 the overall device of the present invention has been assigned the reference numeral "200".

As seen in FIGS. 15A and 15B, the first part of device 200 is the attachment element 220 that is a thin disk that may be round or square. Attachment element 220, which is attached to the metal or glass surface (not shown), conducts heat. Attachment element 220 may be either a magnet or else an electrically conductive plastic. Such electrically conducting plastic would also either have adhering characteristics so that device 200 that are sufficiently strong to adhere the device 200 to the hot surface but sufficiently weak so that the device 200 can be removed from and hence be removably attached to the hot surface. Alternatively, the heat conducting plastic would have a layer of weakly adhering plastic of any kind at a rear surface that comes into contact with the hot metal, glass or other surface. Plastics made of polymers that conduct electricity and transmit heat are known to organic chemists. This attachment element 220 makes the device 200 removably attachable to virtually any hot surface.

The attachment element is designed to withstand temperatures of 500 degrees Fahrenheit or higher since the hot surfaces to which the device of the present invention are to be applied are of the type that can reach such temperature.

The second part of device 200 is composed of the liquid crystal composition 230 itself and a container 240 for containing these crystals 230. Ideally, curved face 242 of container 240 is convex and curved although typically not rounded to the extent of being a hemisphere since if the container 240 had too much of a height it would limit the range of angles from which the letters "HOT" on curved face 242 can be seen. Alternatively, and less ideally, straight face 242a, also called flat face 242a, of container 240a may be used, as seen in FIG. 20. Container 240 is also somewhat disk shaped in that it has a flat rear edge 247 (like the flat side of a hemisphere) that attaches to the flat container attachment side 220b of the attachment element 220. Typically, although not necessarily, container 240 has a larger diameter than the diameter of the attachment element 220 because the diameter of container 240 should reflect the fact that it is desirable that the letters "HOT" on curved face 242 be widely visible while the diameter of attachment element 220 need only be large enough to yield a secure attachment of device 200 to the hot surface.

Container 240 is made of a heat transmitting substance capable of being transparent such as any of a variety of heat conducting glassware products sold under the name "Pyrex" or any heat transmitting plastic that is capable of being transparent. Curved face 242 of container 240 is transparent at least in the portion of curved face 242 that covers the liquid crystal composition 230. Accordingly, curved face 242 displays the letters "HOT" when the surface to which the heat transmission element 220 is attached exceeds a specified temperature, for example a temperature above approximately 115 degrees Fahrenheit.

The attachment element 220 of device 200 has a flat container attachment side 220b that is attached to the flat rear edge 249 of the container 240 by a variety of means, such as by epoxy or by being welded if the heat attachment element is 220 is a magnet. The epoxy should of course not be so extensive that it impedes the heat transmission between the two parts of device 200.

As seen in FIGS. 16A and 16B, an alternative shape of device 200 includes what is called a mushroom shaped container 340 composed of a stem 345 and a convex face 346. Typically, and this is why it is referred to herein as "mushroom shaped", stem 345 is narrower in diameter than convex face 346 although it need not be, because convex face 346 has to be visible whereas stem 345 need only be wide enough for device 200 to be secure for attachment to the hot metal or glass surface by means of attachment element 320. Convex face 346 of container 340 houses the liquid crystal composition 230 and is transparent at least in a portion of the face 346 that covers the liquid crystal composition 230. Alternatively, and less ideally, straight face 346b of container 340b may be used, as seen in FIG. 20B.

As in the shape shown in FIGS. 15A and 15B, container 340 in FIGS. 16A and 16B is made of a heat conductive material. Unlike in FIGS. 15A and 15B, in FIGS. 16A and 16B container 340 has a short cylindrical stem 345 including a rear stem edge 345a and has a convex face 346 that is curved although typically not as much as a hemisphere. The liquid crystal composition 230 is shaped in an outline of the letters "HOT" or in the background of such an outline. Liquid crystal composition 230 is embedded in the convex face 346 of the container 340 and is designed to turn red and remain red whenever the temperature of the hot surface exceeds a specified temperature.

Device 200 shown in FIGS. 16A, 16B, as with device 200 shown in FIG. 15, includes attachment element 320 that is made of a heat conductive material and has a hot surface attachment side 320a and a container attachment side 320b. Attachment element 320 is removable from and attachable to the metal or glass surface on the hot surface attachment side 320a. The rear stem edge 345a on container 340 is flat and attaches to the flat edge of container attachment side 320b of the attachment element 320.

As in FIGS. 15A and 15B, in FIGS. 16A and 16B, device 200 includes container 340 that is either a solid piece of heat transmitting plastic or any of a variety of transparent heat transmitting glassware such as that sold under the name "Pyrex". Likewise, convex face 346 displays the letters "HOT" when the surface to which the heat transmission element 320 is attached is at a specified temperature, such as a temperature above approximately 115 degrees Fahrenheit. Rear stem edge 345a of container 340 attaches to either a magnet 320, which since it is metal transmits heat and is removably attachable to a hot metal or glass surface, or else it attaches to a detachable adhering plastic that also transmits heat and whose adhesive strength is sufficiently weak that it is detachable yet sufficiently strong that it can adhere an object of a decent amount of weight to a smooth metal or glass (or other suitable) surface. An example of a heat transmitting plastic is polyacetylene. 3M, the well known company in Minnesota, manufactures and sells adhesives that are used for temporarily attaching objects that have significant weight to a surface.

As seen in FIG. 17, another alternative shape of device 200 is shown. In this embodiment there is an inner cylinder container 290, in the shape of the hole of a doughnut, for housing the liquid crystal composition 230. Face 292 of inner cylinder container 290 ideally should be convex for better viewing of the letters "HOT" (although face 292 could less ideally also be straight and not convex) and is transparent at least in a portion of face 292 covering the liquid crystal composition 230. Inner cylinder container 290 is made of a heat conductive material capable of being transparent. As in FIGS. 15A, 15B, 16A, 16B, in FIG. 17 the liquid crystal composition 230 is designed to turn red and remain red whenever the temperature of the hot surface exceeds a specified temperature. In this shape shown in FIG. 17, there is an outer cylinder attachment element 280 made of a heat conductive material and in the shape of a doughnut having a flat rear wall (not shown) for attaching to the hot metal or glass surface. The inside wall 289 of the outer cylinder attachment element 280 is attachable to the inner cylinder container 290 and the flat rear wall (not shown) of attachment element 280 allows removable attachment of device 200 to a hot surface. Inner cylinder container 290 is also flat on its inner cylinder container rear wall (not shown) and the inner cylinder container rear wall (not shown) is typically flush with the flat rear wall (not shown) of attachment element 280 in order to not impede the smooth attachment of device 200 to a hot surface.

Each of the embodiments of device 200 depicted in FIGS. 15 through 20 are versatile heat alert safety devices in that they are readily attachable to and later detachable from any surface that may be hot even after the source of the heat has been shut off. Such surfaces can include metal or glass and may include the metal or glass wall of any heat-producing appliance such as the wall of an electric stove, gas stove, smoothtop stove, oven, toaster or a metal crock pot. The hot surfaces to which device 200 can be attached need not be restricted to metal or glass but can be other surfaces that can receive a magnet or temporarily adhering adhesives.

Two or more sides or walls of an appliance can sometimes get hot and the one side might not be suitable to have a heat alert safety device attached to it even though the same heat alert safety device of the present invention is made specifically for the other side of the same appliance. For example, a heat alert safety device of the present invention for the top of an electric stove is not suitable for attachment to a side wall of that stove. Device 200 as depicted in FIGS. 15A, 15B, FIG. 16A, FIG. 16B, FIG. 17, FIG. 19 and FIG. 20 can be applied to any wall of such an appliance since it can be applied to any hot surface. This application is especially useful for kitchen workers surrounded by multiple ovens and/or hot counters—they can place device 200 on each such hot surface.

Other surfaces that get hot and to which device 200 can be usefully applied besides food related appliances include radiator caps located under the hood of a car or other vehicle, piping through which hot steam flows, the surface of a curling iron, surfaces of a steam press and many others listed herein in the Objects and Advantages.

Accordingly, FIG. 18A shows a heat alert safety device 200 designed specifically to be removably attachable to a rounded metal, glass or other hot surface, such as piping, that may be hot. In this embodiment, the heat alert safety device 200 may be of the same shape as the device 200 of FIG. 16 (or alternatively FIG. 15) except with respect to the shape of attachment element 420 of the device 200 of FIG. 18. Since the device 200 shown in FIG. 18 needs to be attached to a rounded surface such as a pipe, the container 440 for housing the liquid crystal composition 230 has a short cylindrical stem 445 including a flat rear stem edge 445a and container 440 has a convex face 446. Attachment element 420 has a concave hot surface attachment side 420a and a flat container attachment side 420, attachment element 420 is removable from and attachable to the rounded hot surface on the hot surface attachment side 420a so as to allow the letters "HOT" to be visible. Flat rear stem edge 445a attaches to the container attachment side 420b of attachment element 420. Alternatively and less ideally, as seen in FIG. 18B, the concavity can also exist at the rear stem edge 445a and at the container attachment side 420b of attachment element 420 (with identical curvature).

Another feature of the present invention that enhances its versatility is that device 200 can be positioned at a height suitable for a small child and can be repositioned later at a different height when the child is older and taller. In a family of many children of different ages and heights there would typically not be room on the walls of an appliance for several different heat alert safety devices of the present invention. With the device 200 depicted in FIGS. 15–16, curved face 242 of FIG. 15 and convex face 346 of FIG. 16 are convex or rounded so that the letters "HOT" thereon may be read from a variety of angles, depending upon the height (and angle of observation) of the observer.

Another way in which the device 200 of the present invention can be read from a variety of angles is that in one embodiment of device 200 its angle of placement with respect to the observer is adjustable. Device 200 can be positioned at different angles from the viewer to maximize the potential for observers, particularly children, to be able to read the letters "HOT". This is especially valuable when the heat alert device 200 is affixed to difficult to access surfaces that may be hard to notice. It is critical that children actually be able to read the letters "HOT" for the device to be effective.

In the embodiment shown in FIG. 19, device 200 can be positioned in a tiltably adjustable format so that the child needed to be warned of the hot surface can most easily read the letters "HOT" shown on convex face 522. At the edge at which stem 545 meets convex face 522 of container 540, well known rotation attachment means (not shown) allows rotation of the convex face 522 with resistance through a discrete number of positions. Convex face 522 can rotate on a frictional fit with stem 545, on threading exiting on stem 545 or by means of other well known rotation attachment techniques. As a result of such rotation, the angle that convex face 522 makes with the hot surface 599 can be adjusted to suit the height of the intended observer. Although FIG. 19 has been presented with device being in the shape shown in FIG. 16A, the embodiment of FIG. 19 can also accommodate others shape of device 200 such as that shown in FIG. 15.

In general, it is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof It is not desired to limit the invention to the exact construction and operation shown and described. The spirit and scope of this invention are limited only by the spirit and scope of the following claims.

What is claimed is:

1. A heat alert safety device attachable to hot surfaces including hot metal surfaces, hot glass surfaces and other hot surfaces, for warning individuals that the surface is hot, comprising:

a liquid crystal composition, a container for housing the liquid crystal composition, said container being transparent at least in a portion of the container covering the liquid crystal composition and being made of heat conductive material, the liquid crystal composition shaped to convey an outline of the letters "HOT", embedded in a flat face of the container and designed to turn red and remain red whenever the temperature of the hot surface exceeds a specified temperature, an attachment element made of a heat conductive material, said attachment element being attachable to the hot surface so as to allow the letters "HOT" to be visible and said attachment element being removable from the hot surface to attach the device to a different hot surface or a different part of the hot surface, the attachment element being able to withstand surface temperatures of at least 300 degrees Fahrenheit.

2. The device of claim 1, wherein the liquid crystal composition is designed to turn red and remain red whenever the surrounding heating element exceeds 115 degrees Fahrenheit.

\* \* \* \* \*